United States Patent Office 2,975,123
Patented Mar. 14, 1961

---

2,975,123

DEWATERING METAL ORE CONCENTRATES

Michael D. Head, Lively, Ontario, Canada, assignor to The International Nickel Company, Inc., New York, N.Y., a corporation of Delaware No Drawing. Filed Jan. 14, 1958, Ser. No. 708,766

Claims priority, application Canada Nov. 4, 1957

10 Claims. (Cl. 210—43)

The present invention relates to improvements in reducing the moisture content of aqueous slurries or pulps to produce relatively dry, friable solids and conditioned filter cakes substantilaly devoid of surface moisture and capable of being handled with facility by concentional methods of materials handling.

As well known to those skilled in the art, considerable difficulty has been encountered with respect to the problem of satisfactorily reducing the moisture content of materials such as ore concentrates obtained from conventional separation procedures. A large amount of water can be removed therefrom, for example, by filtration methods. However, the filter cakes so produced have been found to be wet, sticky and extremely difficult to treat in subsequent processing procedures, e.g., sintering operations employed in metallurgical processes. Experience has shown that it is extremely difficult to sinter wet matte concentrate filter cake having a substantial amount of moisture. Such filter cakes are often undesirably characterized by a large amount of surface moisture which is conductive to "balling," i.e., the tendency of a filter cake to form pellets at transfer points between conveyors and on the top hearth of a roaster. The pellets or balls roast very slowly and increase roasting cost. Moreover, wet, sticky filter cakes often adhere to and build up in chutes at transfer points. Although attempts were made to overcome the foregoing difficulties and other difficulties, none, as far as I am aware, were entirely successful when carried into practice commercially on an industrial scale.

It has now been discovered that, by the addition of small amounts of a special organic agent to slurries or pulps prior to dewatering, the moisture content of the slurries or pulps can be reduced to such an extent that relatively dry, friable, surface moisture-free solids having vastly improved handling characteristics can be readily provided.

It is an object of the present invention to provide a method of reducing the moisture content of slurries or pulps, in which the dewatered solids will contain no more than a desirably low percentage of water.

The invention also contemplates providing a method of dewatering slurries or pulps such as slurries of ore concentrates, in which the dewatered solids produced are readily and easily handled by conventional methods of materials handling.

Another object of the invention is to provide an improved method of filtering slurries or pulps such as slurries of ore concentrates to thereby provide a conditioned filter cake characterized by friability and substantial freedom from surface moisture.

It is a further object of the invention to provide an improved method of filtering slurries or pulps such as slurries of ore concentrates to thereby provide a dewatered and conditioned filter cake characterized in that it is readily handled by conventional methods of materials handling without difficulty.

It is also an object of the invention to provide a special dewatering agent which when incorporated in aqueous slurries or pulps will cause upon filtration a substantial reduction of the moisture content in the slurry and will enable the attainment of a conditioned filter cake.

Other objects and advantages of the invention will become more readily apparent from the following description.

Generally speaking, the present invention contemplates the improved method for dewatering slurries or pulps to provide relatively dry, friable and easily handled solids characterized by freedom from surface moisture which comprises incorporating in a slurry or pulp a small but effective amount up to about 1% by weight of the slurry or pulp solids of a dewatering and conditioning agent comprised of a tertiary amino alkyl ester of a fatty acid and having the general formula $$R_1-\overset{O}{\underset{\|}{C}}-O-R_2-N\diagup\overset{R_3-OH}{\diagdown R_4-OH}$$

wherein $R_1$ represents a hydrocarbon chain of a fatty acid containing from about 11 to 17 carbon atoms, and $R_2$, $R_3$ and $R_4$ represent saturated hydrocarbon chains of 2 to 3 carbon atoms, and then dewatering the so-treated slurry or pulp, e.g., by filtration, to thereby remove a substantial proportion of the water from the slurry or pulp.

The slurries or pulps which are treated according to the present invention comprise mixtures of solids, e.g., ore concentrates, and water, the solids comprising up to 80% of the mixture by weight. The solids, e.g., ore concentrates, range in particle size up to a maximum of 48 mesh, or 300 microns.

In accordance with the present invention, concentrates from a wide variety of ores may be satisfactorily treated. For example, concentrates of metal sulfides such as chalcopyrite and/or pentlandite and pyrrhotite, and other metallurgical products, such as nickel sulfide concentrates produced by separation of finely ground slow cooled matte, fine iron oxides separated from roaster gases, as well as concentrates derived from oxidic ores, e.g., uranium ores, can be suitably treated.

A relatively small amount of the aforementioned dewatering and conditioning agent when added to slurries or pulps is exceedingly effective in reducing the moisture content thereof. Highly satisfactory results have been obtained when 0.05 to 1 pound of dewatering and conditioning agent per ton of pulp solids have been added to ore pulps containing concentrates of chalcopyrite and/or pentlandite and pyrrhotite, or to pulps containing other metallurgical products such as nickel sulfide or mixtures of iron and nickel oxide.

I have further found that the dewatering and conditioning agent is more effective in achieving optimum and highly satisfactory results when the agent is mixed with a hydrocarbon oil such as kerosene, coal oil, fuel oil, gasoline or similar hydrocarbon. It is preferred to employ about 0.1 to about 0.2 pound of the dewatering and conditioning agent, mixed with about 0.4 to about 0.8 pound of hydrocarbon oil per ton of pulp solids in achieving a marked improvement in the characteristics of the cake obtained by filtering the pulp, while keeping the cost of the treatment at a low level. However, the dewatering and conditioning agent will be effective when diluted with up to about 10 or more parts of hydrocarbon oil per part of agent by weight. It is further preferred to employ tertiary amino alkyl esters of unsaturated fatty acids when a mixture thereof and a hydrocarbon oil is used because the esters of the unsaturated acids are more readily soluble in the oil, e.g., kerosene, fuel oil, etc.

In carrying the invention into practice, it is preferred to use a dewatering and conditioning agent comprising the mixed oleic and linoleic acid esters of trihydroxyethylamine, i.e., di(hydroxyethyl) aminoethyl oleate and linoleate. This agent, which is represented by the formula $RCOOCH_2CH_2N(C_2H_4OH)_2$, the letter R being the hydrocarbon chain of distilled tall oil fatty acids (mainly oleic and linoleic acids with small proportions of saturated fatty acids and rosin acids), is viscous, oily, amber colored, strongly lipophilic, soluble in oil, alcohol and toluol and emulsifiable in water. One method for preparing this agent comprises reacting equal mole proportions of triethanolamine and tall oil fatty acids under such conditions that a molecular proportion of water is removed.

Another dewatering and conditioning agent contemplated in accordance with the invention comprises the oleic acid ester of triethanolamine, i.e., di(hydroxyethyl) aminoethyl oleate. The physical characteristics of this agent are similar to those of the mixed oleic and linoleic acid esters of trihydroxyethylamine described hereinabove, the formula being the same except that R represents the hydrocarbon chain of oleic acid.

When the preferred dewatering and conditioning agent described hereinbefore is mixed with a hydrocarbon oil, it is preferred to use a mixture consisting of one part of dewatering agent and four parts of hydrocarbon oil by weight.

For the purpose of giving those skilled in the art a better understanding of the invention and advantages thereof, the following illustrative examples are given:

*Example I*

A filter feed slurry was dewatered using a leaf filter of the type commonly used for filterability tests on pulps. The filter cloth was cotton twill. The filter leaf was immersed in the pulp and vacuum was applied for one minute to build up the cake to a thickness of about one inch and then the filter was withdrawn from the pulp and vacuum was applied for an additional two minutes to dry the cake. The applied vacuum was 20 inches of mercury. Pulp temperature was maintained at about 80° F. The pulp solids of the slurry comprised largely pentlandite, pyrrhotite, chalcopyrite and fine rock. The slurry was approximately 65% solids by weight. The particle size expressed as the percent passing a 200 mesh Tyler screen when dry, was 70% on the average. No dewatering and conditioning agent was added to the slurry; and the final cake moisture was 13.3% by weight. The cake was wet and plastic and difficult to handle. A duplicate sample of the slurry was filtered under the same conditions except that, prior to filtration, there was added to this second portion of slurry a small proportion of the preferred dewatering and conditioning agent described above, i.e., the mixed oleic and linoleic acid esters of trihydroxyethylamine, amounting to 0.10 pound per ton of solids. No kerosene or other hydrocarbon was added. The final cake moisture was 12.7% by weight. The cake was substantially friable, free from surface moisture, and easily handled.

*Example II*

Another portion of the slurry described in Example I was dewatered under the conditions there set forth, except that 0.10 pound of the preferred agent per ton of solids was added together with 0.40 pound of kerosene per ton of solids. The final cake moisture was 12.4% by weight. The cake was friable, free from surface moisture, and easily handled.

*Example III*

Another portion of the slurry described in Example I was dewatered under the conditions there set forth, except that the amount of the preferred agent added was 0.40 pound per ton of solids. No kerosene or other hydrocarbon was added. The final cake moisture was 12.2% by weight. The cake was friable, free from surface moisture, and easily handled.

*Example IV*

Another portion of the slurry described in Example I was dewatered under the conditions there set forth, except that 0.20 pound of the preferred agent per ton of solids was added together with 0.80 pound of kerosene per ton of solids. The final cake moisture was 11.8% by weight. The cake was friable, free from surface moisture, and easily handled.

*Example V*

A filter feed slurry was dewatered using a 14' x 16' Dorrco rotary drum filter. The filter cloth used was cotton twill, and cake was built up thereon to a thickness of about one-half inch. The filter speed was 4 minutes per revolution. A vacuum of 23 inches of mercury was maintained; and filtration proceeded at a pulp temperature of about 100° F. The pulp solids of the slurry comprised largely chalcopyrite, pentlandite, pyrrhotite and fine rock. The feed density, expressed as percent solids by weight, was roughly 70%. The particle size, expressed as the percent passing a 200-mesh screen when dry, was 70% on the average. No dewatering and conditioning agent was added to the slurry; and the final cake moisture was 13% by weight. The cake was plastic and difficult to handle. A second portion of the same slurry was filtered under the same conditions; however, prior to filtration, there had been added to this second portion of slurry a small proportion of the mixed oleic and linoleic acid esters of trihydroxyethylamine described above, dissolved in light fuel oil. The mixture contained one part of the acid esters to five parts of light fuel oil by weight and the mixture was added at a rate of 0.9 pound of mixture per ton of pulp solids. The final cake moisture was 11.8% by weight. The cake was friable, free from surface moisture, and easily handled.

*Example VI*

A filter test was conducted substantially as described in Example I above except that the pulp solids of the slurry comprised mainly chalcopyrite, with only minor amounts of other minerals and a minor amount of rock. The slurry was approximately 66% solids by weight. The particle size, expressed as the percent passing a 200 mesh screen, was 78% on the average. The filter leaf was immersed in the pulp and vacuum was applied for one minute to build up the cake to a thickness of five eighths of one inch, and then the filter was withdrawn from the pulp and vacuum was applied for an additional two minutes to dry the cake. No dewatering agent was added to the slurry and the final cake moisture was 10.5% by weight. The cake was wet and plastic and difficult to handle. A duplicate sample of the slurry was filtered under the same conditions except that prior to filtration there was added to the pulp a small proportion of the mixed oleic and linoleic acid esters of trihydroxyethylamine, amounting to 0.15 pound per ton of pulp solids, together with 0.60 pound of light fuel oil per ton of solids. The final cake moisture was 10.0% by weight. The cake was friable, free from surface moisture and easily handled.

*Example VII*

Another portion of the slurry described in Example VI was dewatered under the conditions there set forth, except that the amount of the mixed oleic and linoleic acid esters of trihydroxyethylamine added was 0.25 pound per ton of solids together with 1.0 pound of light fuel oil per ton of solids. The final cake moisture was 9.7% by weight. The cake was friable, free from surface moisture, and easily handled.

*Example VIII*

A filter test was conducted substantially as described in Example I above except that the pulp solids of the slurry consisted of a product containing nickel sulfide, $Ni_3S_2$, with minor amounts of copper sulfide, $Cu_2S$, obtained by separation of finely ground, slow-cooled copper-nickel matte. The slurry was approximately 75% solids by weight. The particle size expressed as the percent passing a 325 mesh Tyler screen was 90% on the average. The filter leaf was immersed in pulp and vacuum was applied for one-half minute to build up the cake to a thickness of one inch, and then the filter was withdrawn from the pulp and vacuum was applied for an additional two minutes to dry the cake. No dewatering agent was added to the slurry and the final cake moisture was 13.0% by weight. The cake was wet and plastic and difficult to handle. A duplicate sample of the slurry was filtered under the same conditions except that, prior to filtration, there was added to the second portion of slurry a small proportion of the mixed oleic and linoleic acid esters of trihydroxyethylamine, amounting to 0.15 pound per ton of solids, together with 0.6 pound of light fuel oil per ton of solids. The final cake moisture was 12.3% by weight. The cake was substantially friable, free from surface moisture and easily handled.

*Example IX*

Another portion of the slurry described in Example VIII above was dewatered under the conditions there set forth, except that the amount of the acid esters added was 0.25 pound per ton of solids together with 1.0 pound of light fuel oil per ton of solids. The final cake moisture was 10.7% by weight. The cake was friable, free from surface moisture, and easily handled.

*Example X*

A filter test was conducted substantially as described in Example I above except that the pulp solids of the slurry consisted of fine hematite dust with a small amount of nickel oxide, a product such as would be obtained by wet scrubbing of pyrrhotite roaster gases. The filter leaf was immersed in pulp and vacuum was applied for one quarter of one minute to build up the cake to a thickness of three quarters of one inch and then the filter was withdrawn from the pulp and vacuum was applied for an additional two minutes to dry the cake. No dewatering agent was added to the slurry and the final cake moisture was 22.6% by weight. A duplicate sample of the slurry was filtered under the same conditions except that, prior to filtration, there was added to the second portion of slurry a small proportion of the mixed oleic and linoleic acid esters of trihydroxyethylamine, amounting to 0.5 pound per ton of pulp solids, together with 2 pounds of light fuel oil per ton of solids. The final cake moisture was 21.4% by weight. The cake was friable, free from surface moisture and easily handled.

*Example XI*

Another portion of the slurry described in Example X was dewatered under the conditions there set forth, except that the amount of the acid esters added was 1.0 pound per ton of solids together with 4.0 pounds of light fuel oil per ton of solids. The final cake moisture was 20.4% by weight. The cake was friable, free from surface moisture and easily handled.

*Example XII*

Another portion of the slurry described in Example X was dewatered under the conditions there set forth, except that the amount of the acid esters added was 2.0 pounds per ton of solids together with 8.0 pounds of light fuel oil per ton of solids. The final cake moisture was 18.2% by weight. The cake was friable, free from surface moisture and easily handled.

It will be appreciated that not only do the dewatering and conditioning agents of the present invention reduce the moisture content of filter cakes obtained from aqueous slurries, but they also provide filter cakes which are not wet, sticky, plastic or difficult to handle. The filter cakes produced in accordance with the invention are friable and easily handled despite the presence of retained moisture. This feature is attributable to the fact that the dewatering and conditioning agents cause or effect the elimination of all or substantially all of the detrimental surface moisture that would be normally present. Small amounts of the dewatering and conditioning agents of the invention, e.g., as little as about 0.002% and up to 1% by weight of the slurry solids, are effective to produce results contemplated in accordance with the invention.

As has been pointed out before, the invention is applicable in dewatering a wide range of materials having varying compositions and physical characteristics. Examples of such materials are products containing, among others, nickel and/or copper and/or iron values. The invention is particularly applicable in the dewatering of nickel sulfide matte concentrates and also nickel, copper and iron sulfide ore concentrates comprising mostly pentlandite, chalcopyrite, and/or pyrrhotite, such as those produced from the ores occurring in the Sudbury region of Canada.

The present invention is also particularly applicable in connection with the use of continuous rotary filters of the drum type. However, the invention is also applicable to dewatering operations conducted in other types of vacuum filters and with various types of non-vacuum filters, such as filter presses and other pressure filters; in dewatering equipment that utilizes centrifugal forces, such as centrifugal filters and centrifuges; and in equipment which serves to drain water from the concentrates under the influence of gravity. The invention is also applicable in other types of equipment or operations to which the dewatering of ore concentrates is either a necessary or a desirable incident.

Although the present invention has been described in conjunction with preferred embodiments, it is to be understood that modifications and variations may be resorted to without departing from the spirit and scope of the invention, as those skilled in the art will readily understand. Thus, it will be understood that the invention is applicable to the dewatering of wet metal sulfides generally; and the term "ore concentrates" as used herein includes such sulfides, as well as other metalliferous materials. Such modifications and variations are considered to be within the purview and scope of the invention and appended claims.

I claim:

1. In a procedure for treating aqueous slurries of metal ore concentrates wherein there is established an aqueous slurry of metal ore concentrate which is subsequently subjected to a filtration operation to form a filter cake, the improved method of providing a filter cake which is friable and substantially free of surface moisture which comprises incorporating into said aqueous slurry a small but effective amount up to about 1% by weight of the solids of said slurry of a dewatering and conditioning agent consisting essentially of a tertiary amino alkyl ester of a fatty acid represented by the formula

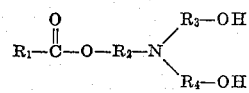

wherein $R_1$ represents the hydrocarbon chain of a fatty acid containing 11 to 17 carbon atoms and $R_2$, $R_3$ and $R_4$ represent a saturated hydrocarbon chain containing from 2 to 3 carbon atoms, to thereby form on filtration a filter cake of metal ore concentrate which has a substantially lower proportion of water, better handling characteristics and which is further characterized by friability and a surface substantially free of surface moisture as compared to the filter cake formed when no such ester is added.

2. A process as described in claim 1 wherein the dewatering and conditioning agent is added in an amount of about 0.05 to about 1 pound per ton of solids.

3. In a procedure for treating aqueous slurries of metal ore concentrates wherein there is established an aqueous slurry of metal ore concentrate which is subsequently subjected to a filtration operation to form a filter cake, the improved method of providing a filter cake which is friable and substantially free of surface moisture which comprises incorporating into said aqueous slurry a small but effective amount up to about 1% by weight of the solids of said slurry of a dewatering and conditioning agent consisting essentially of the mixed oleic and linoleic acid esters of trihydroxyethylamine, to thereby form on filtration a filter cake of metal ore concentrate which has a substantially lower proportion of water, better handling characteristics and which is further characterized by friability and a surface substantially free of surface moisture as compared to the filter cake formed when no such ester is added.

4. In a procedure for treating aqueous slurries of metal ore concentrates wherein there is established an aqueous slurry of metal ore concentrate which is subsequently subjected to a filtration operation to form a filter cake, the improved method of providing a filter cake which is friable and substantially free of surface moisture which comprises incorporating into said aqueous slurry a small but effective amount up to about 1% by weight of the solids of said slurry of a dewatering and conditioning agent consisting essentially of the oleic acid ester of trihydroxyethylamine, to thereby form on filtration a filter cake of metal ore concentrate which has a substantially lower proportion of water, better handling characteristics and which is further characterized by friability and a surface substantially free of surface moisture as compared to the filter cake formed when no such ester is added.

5. In a procedure for treating aqueous slurries of metal ore concentrates wherein there is established an aqueous slurry of metal ore concentrate which is subsequently subjected to a filtration operation to form a filter cake, the improved method of providing a filter cake which is friable and substantially free of surface moisture which comprises incorporating into said aqueous slurry a mixture of a hydrocarbon oil with a small but effective amount up to about 1% by weight of the solids of said slurry of a dewatering and conditioning agent comprised of a tertiary amino alkyl ester of a fatty acid represented by the formula

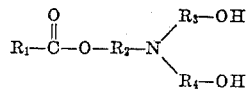

wherein $R_1$ represents the hydrocarbon chain of a fatty acid containing from 11 to 17 carbon atoms and $R_2$, $R_3$ and $R_4$ represent a saturated hydrocarbon chain containing from 2 to 3 carbon atoms, to thereby form on filtration a filter cake of metal ore concentrate which has a substantially lower proportion of water, better handling characteristics and which is further characterized by friability and a surface substantially free of surface moisture as compared to the filter cake formed when no such ester is added.

6. A process as described in claim 5 wherein said ester is added in an amount of about 0.1 to about 0.2 pound and the said hydrocarbon oil is added in an amount of about 0.4 to about 0.8 pound per ton of solids in said slurry.

7. In a procedure for treating aqueous slurries of metal ore concentrates wherein there is established an aqueous slurry of metal ore concentrate which is subsequently subjected to a filtration operation to form a filter cake, the improved method of providing a filter cake which is friable and substantially free of surface moisture which comprises incorporating into said aqueous slurry a mixture of hydrocarbon oil and a small but effective amount up to about 1% by weight of the solids of said slurry of a dewatering and conditioning agent comprised of the mixed oleic and linoleic acid esters of trihydroxyethylamine, to thereby form on filtration a filter cake of metal ore concentrate which has a lower proportion of water, better handling characteristics and which is further characterized by friability and a surface substantially free of surface moisture as compared to the filter cake formed when no such ester is added.

8. In a procedure for treating aqueous slurries of metal ore concentrates wherein there is established an aqueous slurry of metal ore concentrate which is subsequently subjected to a filtration operation to form a filter cake, the improved method of providing a filter cake which is friable and substantially free of surface moisture which comprises incorporating into said aqueous slurry a mixture of hydrocarbon oil and a small but effective amount up to about 1% by weight of the solids of said slurry of a dewatering and conditioning agent comprised of the oleic acid ester of trihydroxyethylamine, to thereby form on filtration a filter cake of metal ore concentrate which has a lower proportion of water, better handling characteristics and which is further characterized by friability and a surface substantially free of surface moisture as compared to the filter cake formed when no such ester is added.

9. In a procedure for treating aqueous slurries of metal ore concentrates wherein there is established an aqueous slurry of metal ore concentrate which is subsequently subjected to a filtration operation to form a filter cake, the improved method of providing a filter cake which is friable and substantially free of surface moisture which comprises establishing an aqueous slurry of metal ore concentrate having a particle size not greater than about 300 microns, incorporating into said aqueous slurry of metal ore concentrate a small but effective amount up to 1% by weight of the solids of said slurry of a dewatering and conditioning agent consisting of a tertiary amino alkyl ester of a fatty acid represented by the formula

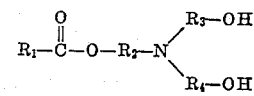

wherein $R_1$ represents the hydrocarbon chain of a fatty acid containing 11 to 17 carbon atoms and $R_2$, $R_3$ and $R_4$ represent a saturated hydrocarbon chain containing from 2 to 3 carbon atoms, to thereby form on filtration a filter cake of metal ore concentrate which has a lower proportion of water, better handling characteristics and which is further characterized by friability and a surface substantially free of surface moisture as compared to the filter cake formed when no such ester is added.

10. A process as described in claim 9 wherein $R_2$, $R_3$ and $R_4$ represent saturated hydrocarbon chains containing 2 carbon atoms.

References Cited in the file of this patent

UNITED STATES PATENTS

| | | |
|---|---|---|
| 1,960,917 | Nagelvoort | May 29, 1934 |
| 2,383,128 | Hultquist | Aug. 21, 1945 |

FOREIGN PATENTS

| | | |
|---|---|---|
| 469,559 | Great Britain | July 27, 1937 |